Patented Apr. 1, 1952

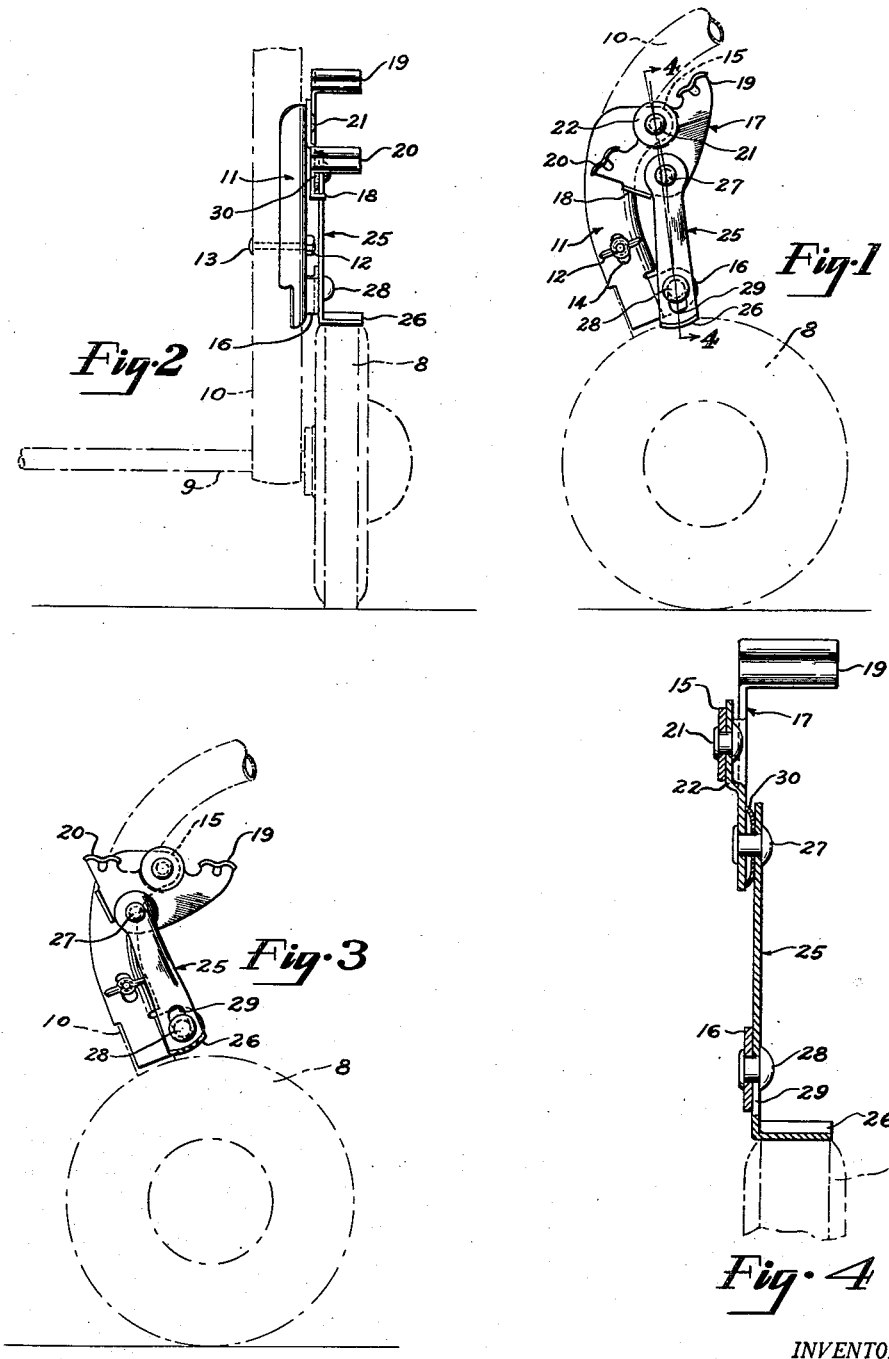

2,591,524

UNITED STATES PATENT OFFICE 2,591,524

ADJUSTABLE BRAKE FOR TUBULAR FRAME VEHICLES

Alvin P. Douglas, Cleveland, and Leonard J. Walters, Shaker Heights, Ohio, assignors to The Murray Ohio Manufacturing Company, Cleveland, Ohio, a corporation of Ohio Application May 20, 1950, Serial No. 163,254

5 Claims. (Cl. 188—2)

This invention relates to improvements in a parking brake for juvenile vehicles and the like having a tubular frame. The general object of this invention is the provision of a simple, sturdy, low cost, parking brake for attachment to a tubular frame of a juvenile vehicle.

Another object of this invention is the provision of a brake which is adjustable to insure secure holding, as the tire or wheel wears on which the brake acts.

Other objects and advantages of the invention will be apparent from the following detailed description of preferred forms of embodiment of the invention, references being made to the accompanying drawings wherein—

Fig. 1 is a side view of the brake in holding position as attached to a tubular member of a vehicle;

Fig. 2 is a back view corresponding to Fig. 1;

Fig. 3 is a view similar to Fig. 1, with the brake in the off position;

Fig. 4 is a section through the brake, taken along the line 4—4 in Fig. 1.

In the drawings there is shown in outline form a part of the vehicle for which the present brake is adapted, comprising a rubber tire wheel 8, carried on an axle 9 which passes through a curved tubular member 10. A base plate 11 conformed generally to the exterior curvature of member 10 is held thereon by a wing nut 12 and bolt 13 which passes through the tubular member and through an adjusting slot 14, in the plate.

To one side of plate 11, at the upper end, there is provided an ear or projection 15, and at the lower end a bracket 16. A brake operating plate 17, having three projections at right angles to the body of the plate, namely the stop 18, release toe piece 19 and parking toe piece 20, is pivotally mounted on ear 15 by a rivet 21 passing through the center of the circular boss 22 formed by off setting or depressing the metal between the toe pieces. The braking plate 25, carrying a projecting brake face 26 is pivotally connected near its top end to operating plate 17 by rivet 27, and is held against bracket 16 in slidable and pivotal relation by a headed guide pin or guide rivet 28 in the longitudinal guide slot 29 located near the brake face 26. A cupped type spring washer 30 is preferably interposed between operating plate 17 and braking plate 25 at the pivotal connection. The braking face 26 is preferably curved convexly with respect to the wheel, while the projecting pedal portions or toe pieces 18 and 19 may be shaped to confer added strength and rigidity. The brake is operated respectively to released and parking position by downward foot pressure respectively on toe pieces 19 and 20. The bottom of the guide slot 29, coming against rivet 28, serves as a stop for the releasing motion of the brake. However, the stop projection 18 is provided between the toe piece 20 and the braking plate 25 to abut against plate 25 when the pivot rivet 27 has passed somewhat beyond the centerline between pivot rivets 21 and 28 as the brake is set to the on or park position.

This brake may be adjusted in position downwardly along vehicle frame member 10 as the tire of wheel 10 wears, because of the provision of slot 14 in plate 11. All the main members of this brake, plates 11, 17 and 25 may be simple stampings formed from sheet steel, and, hence, are susceptible of low cost volume production. The assembling of the brake is then simply a matter of riveting the three pieces together.

We claim:

1. A brake for a tubular frame vehicle comprising a base plate conformed to the exterior curvature of a tubular member of said vehicle; a braking plate provided at its lower end with a projecting braking face adapted to engage a wheel of the vehicle when the brake is set; a pin and slot connection operatively arranged between the two said plates comprising a headed guide pin adjacent the lower end of one of the two said plates and a cooperating guide slot located near the lower end of the other of said two plates, whereby the lower end of said braking plate is held in longitudinally slidable relation to the lower end of said base plate; a brake operating plate pivotally connected to the base plate and pivotally connected to the upper end of said braking plate, said operating plate being provided with pedal portions disposed on either side of the pivotal connection to said base plate.

2. A parking brake for a tubular frame vehicle comprising a base plate conformed in shape to a tubular member of said vehicle for mounting thereon; an upper and lower ear projecting from said base plate; a braking plate provided at its lower end with a projecting braking face adapted to engage a wheel of the vehicle when the brake is set and a longitudinal guide slot near said end; a guide rivet in the said slot and said lower ear holding said braking plate in slidable relation to said base plate; and a brake operating plate pivotally connected to the base plate at said upper ear and also pivotally connected to the upper end of said braking plate, said operating plate being provided with a pair of pedal portions disposed on either side of the pivotal connection to said upper ear.

3. A brake for a tubular frame vehicle comprising a base plate conformed to the exterior curvature of a tubular member of said vehicle; a braking plate provided at its lower end with a projecting braking face adapted to engage a wheel of the vehicle when the brake is set and a longitudinal guide slot near said end; a guide rivet in said slot holding said braking plate in slidable relation to the lower end of said base plate; a brake operating plate pivotally connected to the base plate and also pivotally connected to the upper end of said braking plate, said operating plate being provided with pedal portions disposed on either side of the pivotal connection to said base plate, and being provided with a stop adapted to abut against said braking plate when the brake is set to its holding position.

4. A brake for a tubular frame vehicle comprising a base plate conformed to the exterior curvature of a tubular member of said vehicle; a braking plate provided at its lower end with a projecting braking face adapted to engage a wheel of the vehicle when the brake is set and a longitudinal guide slot near said end; a guide rivet in said slot holding said braking plate in slidable relation to the lower end of said base plate; a brake operating plate pivotally connected to the base plate and also pivotally connected to the upper end of said braking plate, said operating plate being provided with pedal portions disposed on either side of the pivotal connection to said base plate, and being provided with a stop adapted to abut against said braking plate when the brake is set to its holding position; and a cupped type spring washer between said braking plate and said operating plate at the pivotal connection thereof.

5. In a tubular frame vehicle, a parking brake adjustably mounted to a tubular member of the vehicle frame to compensate for brake and wheel wear, said brake comprising a base plate conformed to the exterior curvature of said tubular member and provided with an adjustment slot, said base plate being secured in adjusted position by a bolt extended through said slot and said tubular member; a braking plate provided at its lower end with a projecting braking face adapted to engage a wheel of the vehicle when the brake is set, a pin and slot connection operatively arranged between the two said plates comprising a headed guide pin adjacent the lower end of one of the two said plates and a cooperating guide slot located near the lower end of the other of two said plates, whereby the lower end of said braking plate is held in longitudinally slidable relation to the lower end of said base plate; and a brake operating plate pivotally connected to the base plate and pivotally connected to the upper end of said braking plate, said operating plate being provided with pedal portions disposed on either side of the pivotal connection to said base plate.

ALVIN P. DOUGLAS.
LEONARD J. WALTERS.

REFERENCES CITED

The following references are of record in the file of this patent:

UNITED STATES PATENTS

| Number    | Name    | Date          |
|-----------|---------|---------------|
| 2,147,064 | Schultz | Feb. 14, 1939 |

FOREIGN PATENTS

| Number | Country | Date          |
|--------|---------|---------------|
| 74,927 | Austria | Nov. 11, 1918 |